G. F. WELLS.
ELECTRICAL COOKING UTENSIL.
APPLICATION FILED SEPT. 22, 1921.
1,437,122.
Patented Nov. 28, 1922.
2 SHEETS—SHEET 1.
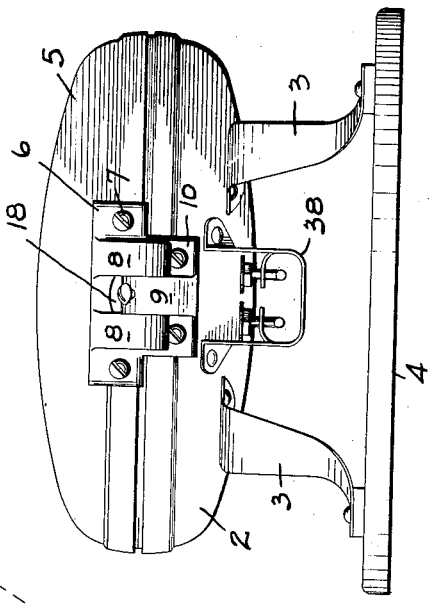
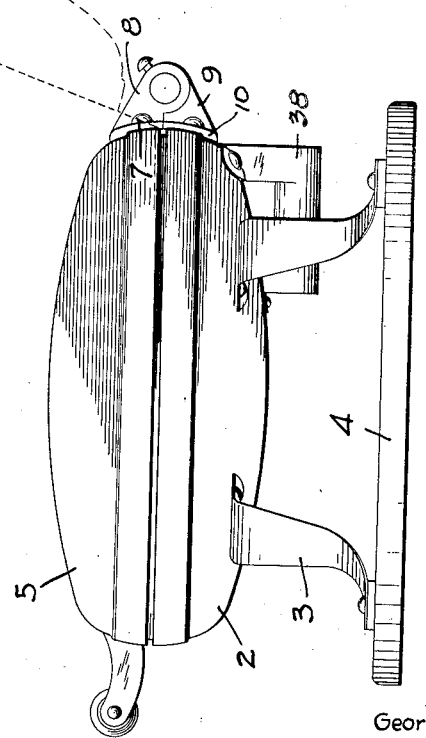
WITNESS
H. Sherburne
INVENTOR
George F. Wells.
BY
White Frost Evans
his ATTORNEYS

G. F. WELLS.
ELECTRICAL COOKING UTENSIL.
APPLICATION FILED SEPT. 22, 1921.

1,437,122.

Patented Nov. 28, 1922.
2 SHEETS—SHEET 2.

WITNESS
H. Sherburne

INVENTOR
George F. Wells.
BY
White Frost & Evans
his ATTORNEYS

Patented Nov. 28, 1922.

1,437,122

UNITED STATES PATENT OFFICE.

GEORGE F. WELLS, OF SAN FRANCISCO, CALIFORNIA.

ELECTRICAL COOKING UTENSIL.

Application filed September 22, 1921. Serial No. 502,520.

*To all whom it may concern:*

Be it known that I, GEORGE F. WELLS, a citizen of the city and county of San Francisco, State of California, have invented a new and useful Electrical Cooking Utensil, of which the following is a specification.

The present invention relates to domestic cooking devices, more particularly of the portable type, a form of which is here represented as a waffle iron, although it is to be understood that my invention may be embodied in other types of utensils.

It is an object of the present invention to provide in an electrical cooking utensil having hingedly connected parts, means simplifying the electrical connections and wiring of the device for the distribution of an electrical current to the various so-called electric heating elements that may be employed.

It is, therefore, an object to provide an improved electrical connection whereby only one plug attachment and connection is necessary and from which current is distributed to a plurality of heating elements, it being in this connection, an object to eliminate and overcome the use of multiple plugging attachments and more particularly to eliminate the requirement of an individual plugging attachment for each heating element.

It is another object of the invention to provide especially an improved type of electrical connection and hinge joint in electrical devices where parts are hingedly connected and each of the parts is provided with an electrically energized instrument; the improved hinge joint providing for the arrangement of the wiring in a concealed and protected manner wholly within the elements of the hinge joint.

Another object of the invention is to provide a simple, inexpensive and practicable combination of shell sections with respective cooking devices. In this relation it is a further object of the invention to provide a system of construction in which the cooking utensil may, in the course of its manufacture, be built up in organized unit assemblies, each substantially complete and adapted to be be readily, accurately and quickly mounted upon and associated with another respective unit organization.

The invention possesses other objects and features of advantage, some of which, with the foregoing, will be made manifest in the following description of the preferred form of the invention, which is illustrated in the drawings accompanying and forming part of the specification. It is to be understood that it is not intended to limit the invention to the embodiment shown by the said drawings and description, as variations may be adopted within the scope of the invention as set forth in the claims.

Fig. 1 is a side elevation of an embodiment of the invention in a waffle iron.

Fig. 2 is a rear elevation of the same.

Figure 3:
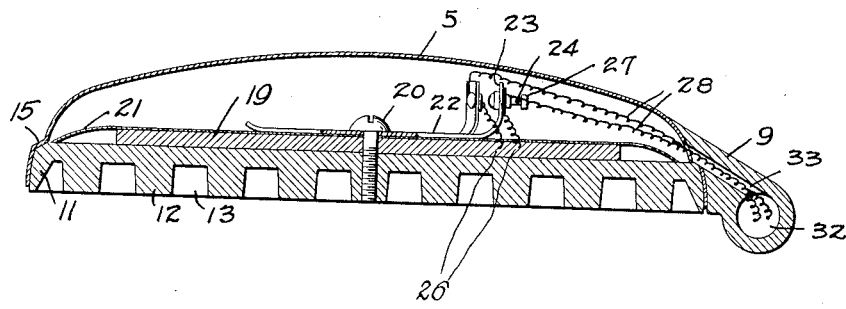
Fig. 3 is a sectional view of the upper shell section with the associated parts.

The invention in the present instance, is shown as embodied in a cooking utensil having a pair of hingedly connected shell sections which may be made in any desired manner and of any suitable material, each of the shell sections being substantially bowl-shaped and provided with a cooking means, comprising, as here shown, waffle plates, which are arranged in the respective shell sections and are adapted to be brought into overlapping face to face position in the usual manner of waffle irons. One feature of the present invention resides in the novel means of securing the inexpensive mounting of the respective waffle plates in the shell sections. Another feature of the invention is the improved hinge construction by which the shell sections are movably connected to each other and which hinge structure is designed to form a housing through which extend conducting wires to serve electric current to electrical heating elements which are interposed between the shell sections and their respective cooking plates; the heating elements preferably being secured to the cooking plates. By providing for the attachment of each of the heating elements directly to its respective cooking plates, these parts may be assembled in the factory as a unitary organization and it is desirable to provide means in such organization to which there may be readily and accurately connected the electric service wires. It is also desirable to provide for the assembly of the relative shell sections as a unitary organization and to provide for the distribution of the service wires and to enable the completion of an electric circuit by the attachment of a single service plug to one or the other of the shell sections, as may be desired and from one single plug connection current will be distributed to the several electrical heating units in the shell sections. By constructing and assembling the shell sections and the necessary wiring therewith, as a unitary organization, this enables the rapid and efficient manufacturing and assembly of the waffle plate and its element as one unitary organization and the shells, as another organization, and these are adapted to be quickly and properly wired together and associated in the completion of the utensil.

The shell sections are preferably of duplicate construction so that they may be utilized in the device, either as the bottom or the top of the shell, as will be determined only by the character of the hinge part attached to the shell section. It is also desirable that the cooking plates with their elements be substantially duplicate and readily interchangeable facilitate assembly and repair.

More particularly, in its illustrated embodiment, the invention is incorporated in a utensil comprising a shell-like bottom section 2 on which may be secured or provided, in any desired manner, suitable legs 3, and these may be secured to a base 4. Complementary to the bottom shell 2 is a top or upper shell 5, and these are adapted to be assembled in closed position or one may be lifted from the other, as, for instance, by being turned about a hinge joint connecting them.

A simple joint is shown as including hinge parts, one of which includes a pad or flange 6, which may be attached, as by means of screws 7, to the top shell section 5 and which pad is shown as provided with a pair of spaced lugs 8—8, between which is interposed a co-axial lug 9 provided on a pad or fastening flanges 10, screwed or otherwise secured to a bottom shell section.

Figure 4:
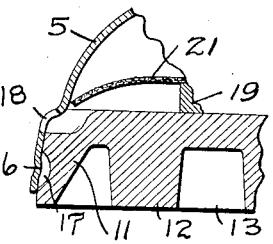
Fig. 4 is a detail sectional view on an enlarged scale showing the interlocking connection between a shell and its associated cooking plate.

The shell sections are substantially duplicate and made of comparatively thin metal and are in the shape of shallow bowls. Within each of the shell sections there is provided a cooking device, here shown as in the form of a waffle plate 11, having on one surface, the usual nogs 12 and webs 13, forming channels to receive the batter. A feature of the present invention resides in the construction of the shell sections and the waffle plates and, as here shown, each shell, which has a circular and slightly tapering wall part or edge is provided with means for determining the position of the inserted waffle plate 11, so that the plates, when brought face to face in the closed or cooking position, bear one upon the other. The peripheral surface of each of the waffle plates is made substantially complementary to the rim of the shell sections and therefore the plate is frictionally held in its position when it is forced into the rim or flange part of a shell section. The position of the waffle plate may be determined in divers manners and, as here shown, each shell has a slight shoulder or bead 15, projecting inwardly at a suitable distance from the circumferential edge of the shell and against which shoulder or bead the inner corner of an inserted plate 11 will abut. While friction may be depended upon to retain an inserted plate to its seat within the shell section, more positive means may be utilized, if desired, and such may consist of interlocking means acting relatively with the flange part of each shell and its inserted plate 11. Such interlocking means in one form is shown in Fig. 4, as including slightly indented spots or zones 16 in the rim or flange part of each shell section, the convex inner surface of these indented spots being designed to project into a slight depression or depressions, as, for instance, a circumferential groove 17 formed in the periphery of the plate 11. This interlocking means serves to provide relative yielding, as between the flange part of the shell section, and the edge of a plate, as the latter is forced into the shell and further prevents the plate from falling from its seat in its shell. To remove the plate from its seat for the purpose of making inspection, renewals or repair, a tool, such as a screw-driver can be inserted in an aperture 18, located, for instance, adjacent the hinge member and the tool pressed against the inserted plate and the latter forced outwardly from its shell.

For heating cooking plate 11, there is arranged upon its back any suitable form of electrical heating element 19 which preferably is assembled upon the back of a plate and fastened, as by means of a screw 20 passing through the element and into the plate. This, therefore, enables the assembly of the plate and its element as one unitary organization which can be readily inserted in its respective shell section, while a pair of the latter is assembled separately as a unitary organization. To further facilitate such separate assembly organizations, electrical connections are secured by the screw 20, upon the electrical element 19; said connections providing for the ready and accurate attachment of the proper service wires. To that end there is mounted, as upon a sheet of asbestos or other insulating material 21, on the top of the heating element, a plate 22 or other suitable piece, which is provided with a pair of upwardly extending and spaced bracket arms 23. Each of these arms 23 has an insulated binding post 24 and from which leads a respective conductor 26 for the terminals of the wiring of the heating unit. On each binding post 24 is a binding nut 27 which is adapted to be set against a service wire, as 28.

One of the features of the present invention is the provision for the distribution of the electric current from a suitable source by means of distributing wires which, in the present case, are protected and concealed by being extended in and through the hinge construction.

Figure 6:
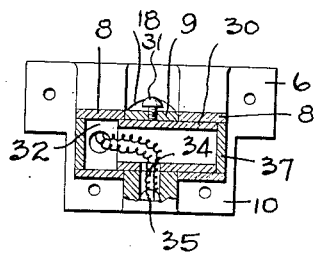
Fig. 6 is a longitudinal central section through the hinge structure taken on the planes indicated at line 6—6, Fig. 5.
Figure 5:
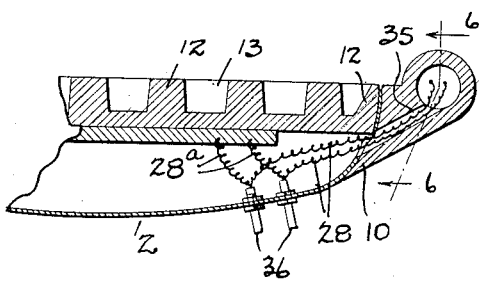
Fig. 5 is a sectional view of a portion of the lower or bottom shell section and its hinge connection.

As shown in Fig. 6, such construction in one form embodies a tubular trunnion 30 which is secured fixedly as by a set screw 31 or otherwise, in the central hinge lug 9 and this tube projects endwise into the end lugs 8—8 of the hinge but terminating in one of the hinges to provide an ample clearance space 32 into which pass the service wires 28, which are adapted to be attached to the binding posts 24, above referred to. These service wires pass through the shell section 5 and into a bore or drill hole 33 extending radially from the pocket 32, and thence the wires 28 extend longitudinally into the pivot tube 30 from where they pass through an opening 34 in the side of the tube and down through a radial hole 35 in the bottom hinge part 10. From this hole 35, the wires 28 pass to respective attachment pins 36 fastened in and insulated from the bottom shell section 2. From each of the pins 36 extend feed wires 28ª to be attached to the binding posts 24 of the heating unit 19 in the lower shell section. The hinge lugs 8—8—9 may be axially bored and the trunnion or pivot tube 30, passed into the bore hole and then secured, as above described, the ends of the bore hole being plugged as at 37. The terminal pins 36 of the wiring may be enclosed and protected in a receptacle 38 into which may be inserted the usual plug connected to an electrical extension cord in the well known manner.

From the above it will be seen that but one plug attachment is necessary to serve current to the terminal pins 36 of the wiring from which pins run said sub-wires 28 and 28ª, one leading to the bottom heating unit and the other to the top heating unit; the latter passing through the hollow hinge joint structure in a practicable, protected and concealed manner, the whole producing a neat and attractive appearance. It will be seen by this system of wiring, that it is possible to organize the shell sections with the complete wiring 20—28 as an entire organization ready to receive the quickly applied, previously organized cooking plate parts, each with its electric heating elements to which electrical connection is readily made by the fastening of the ends of the wires 20 and 28 to the respective binding posts 24.

What is claimed:

1. In an electrical cooking device, a hollow shell having a rim of resilient material, a cooking plate disposed in said shell, and means for detachably holding the plate in the rim comprising a projection on one of said two parts adapted to engage into a space located in the other of the two parts.

2. In an electrical cooking device, a hollow shell having a rim of resilient material, a cooking plate disposed in said shell, and means for detachably holding the plate in the rim comprising a projection on the rim adapted to engage in a groove in the plate.

3. In an electrical cooking device, a pair of cooking plates, and a hinge connecting the plates comprising a lug for each plate, and a hollow tube attached to one of the lugs and rotatable in the other for concealing the connections to the device.

4. In an electrical cooking device, a pair of cooking plates, and a hinge connecting the plates comprising a pair of hollow lugs for one plate, a hollow lug for the other plate, said last-named lug being disposed axially between the others, and a hollow tube extending through the central lug and into one of the other lugs, said tube being fastened to one of the lugs but rotatable in the other.

5. An electrical cooking utensil including hingedly connected shell sections having heating means, and service wires extending through the hinge means.

6. An electrical cooking utensil including hingedly connected shell sections having heating means, and service wires extending through and wholly concealed in the hinge means.

7. A hinge structure for connecting given parts, said structure including hollow aligned, pivotally connected portions, certain of which have outlet openings, whereby electric wires may be threaded into, through and from the structure.

8. A hinge structure for connecting given parts, said structure including hollow aligned, pivotally connected portions, certain of which have outlet openings, whereby electric wires may be threaded into, through and from the structure, and be wholly concealed therein.

9. A hinge structure including a part of hinge pads to be secured on respective parts, each pad having lug means, all in axial alignment; each lug being hollow, certain lugs having lateral opening to the pads, whereby electric wires may be led from part to part through the hinge structure.

10. A hinge structure including a part of hinge pads to be secured on respective parts, each pad having lug means, all in axial alignment; each lug being hollow, certain lugs having lateral opening to the pads, whereby electric wires may be led from part to part through the hinge structure, the lugs being connected by a tubular trunnion.

In testimony whereof, I have hereunto set my hand.

GEORGE F. WELLS.